(12) United States Patent
Wilson

(10) Patent No.: US 7,210,228 B2
(45) Date of Patent: May 1, 2007

(54) METHOD OF MANUFACTURING A FLAT WIPER BLADE ASSEMBLY

(75) Inventor: Larry A. Wilson, Michigan City, IN (US)

(73) Assignee: Federal Mogul World Wide, Inc., Southfield, MI (US)

(*) Notice: Subject to any disclaimer, the term of this patent is extended or adjusted under 35 U.S.C. 154(b) by 0 days.

(21) Appl. No.: 10/797,336

(22) Filed: Mar. 10, 2004

(65) Prior Publication Data

US 2004/0168296 A1    Sep. 2, 2004

Related U.S. Application Data

(62) Division of application No. 10/103,477, filed on Mar. 21, 2002, now Pat. No. 6,766,553.

(51) Int. Cl.
*B60S 1/46* (2006.01)
*B60S 1/38* (2006.01)
*B21D 53/88* (2006.01)

(52) U.S. Cl. .................. 29/897.2; 29/592; 29/DIG. 47; 29/515; 15/250.04; 15/250.43; 15/250.361

(58) Field of Classification Search ............. 15/250.04, 15/250.43, 250.361, 250.44, 250.451, 250.452, 15/250.003, 250.29, 250.4, 250.48, 250.32, 15/245, 250.453; 29/897.2, DIG. 47
See application file for complete search history.

(56) References Cited

U.S. PATENT DOCUMENTS

| | | | |
|---|---|---|---|
| 2,639,455 A | 5/1953 | Schwarzmann | |
| 2,648,865 A | 8/1953 | Gordon et al. | |
| 2,761,169 A | 9/1956 | Krohm | |
| 3,107,384 A | 10/1963 | Wise | |
| 3,383,731 A | 5/1968 | Krohm | |
| 3,574,881 A | 4/1971 | Temple | |
| 3,846,863 A | 11/1974 | Van Den Berg et al. | |
| 4,005,503 A | 2/1977 | Petrick | |
| 4,177,538 A * | 12/1979 | Blaiklock et al. | ........ 15/250.39 |
| 4,339,839 A | 7/1982 | Knights | |
| 4,342,126 A | 8/1982 | Neefeldt | |
| 4,360,941 A | 11/1982 | Mabie | |
| 4,976,001 A | 12/1990 | Wright | |
| 5,487,205 A | 1/1996 | Scherch et al. | |
| 5,564,157 A | 10/1996 | Kushida et al. | |
| 5,661,870 A | 9/1997 | Eustache et al. | |
| 5,661,871 A | 9/1997 | Scorsiroli | |
| 6,163,922 A | 12/2000 | Fisher et al. | |

FOREIGN PATENT DOCUMENTS

| | | |
|---|---|---|
| DE | 3617-395 A | 11/1987 |
| GB | 402189 | 11/1933 |

* cited by examiner

*Primary Examiner*—Gary K. Graham
(74) *Attorney, Agent, or Firm*—Robert L. Stearns; Dickinson Wright PLLC

(57) ABSTRACT

A heavy-duty flat wiper blade assembly has a wiper element and an extruded metallic frame. The frame has a bottom channel with a slot traversing its length in which the wiper element is maintained. The wiper element extends through the slot and outwardly from the bottom channel to make contact with a surface to be wiped. The frame has a closed upper channel that may include a fluid inlet opening for receiving wiper fluid into the channel and a fluid outlet opening for discharging the wiper fluid from the upper channel onto a surface to be wiped.

5 Claims, 3 Drawing Sheets

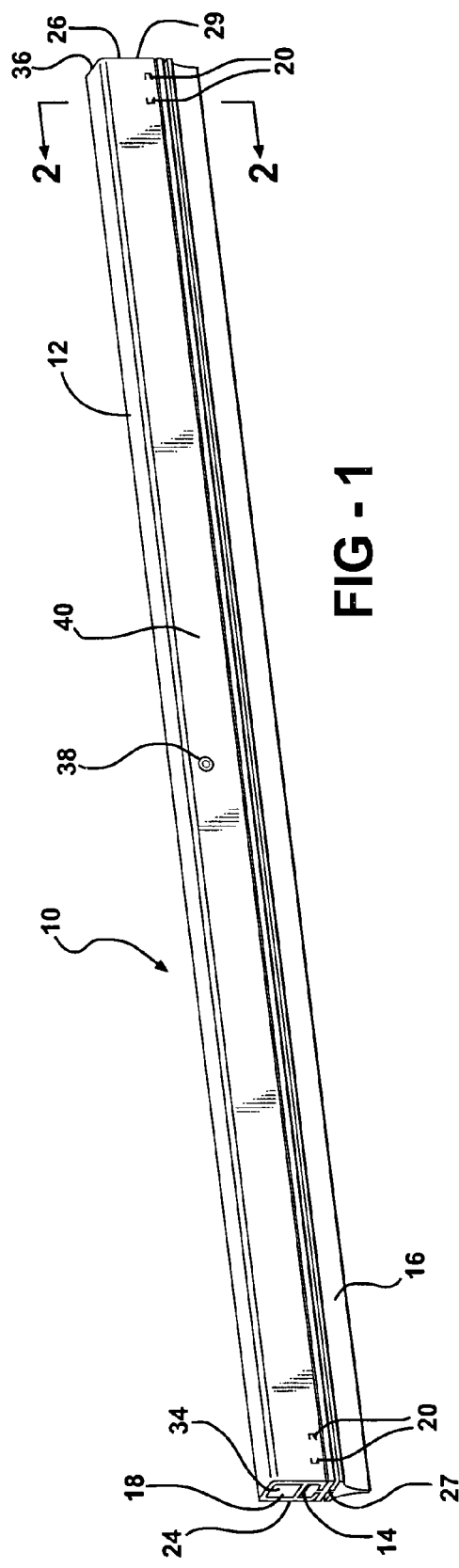
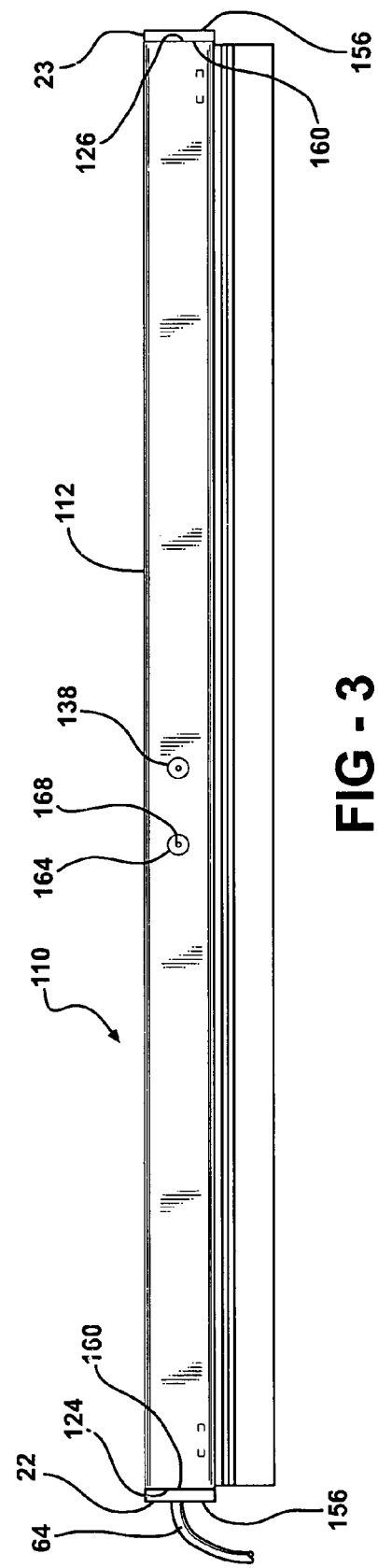

METHOD OF MANUFACTURING A FLAT WIPER BLADE ASSEMBLY

RELATED APPLICATIONS

This application is a divisional of application Ser. No. 10/103,477, filed Mar. 21, 2002 now U.S. Pat. No. 6,766,553.

BACKGROUND OF THE INVENTION

1. Technical Field

This invention relates generally to heavy-duty flat wiper blade assemblies.

2. Related Art

Heavy-duty flat wiper blade assemblies are known having a straight body mounting a rubber wiper element. In one known construction, the body is extruded from a plastic which is, in turn, reinforced by a metal stiffener to provide sufficient structural rigidity to the body, as shown in U.S. Pat. No. 3,107,384. In another known construction, the body is fabricated from a strip of steel which is bent into a generally U-shaped profile in cross-section and crimped along its length to the rubber wiper element to secure the wiper element. In this case, the flat steel body component is cut to length along with the wiper element prior to folding the flat steel over the wiper element.

Both such constructions are costly to manufacture and are limited in the features and advantages they can offer.

Heavy-duty flat wiper blade assemblies constructed according to the present invention overcome or greatly minimize the foregoing limitations of prior wiper blade assemblies.

SUMMARY OF THE INVENTION

A heavy-duty flat wiper blade assembly has a wiper element and an extruded metallic frame. The frame has a bottom channel with a slot and an upper channel separate from the bottom channel. The wiper element is disposed in the bottom channel and extends through the slot to make contact with a surface to be wiped. The upper channel is closed and may optionally be provided with a fluid inlet opening for receiving wiper fluid into the channel and a fluid outlet opening for discharging the wiper fluid from the upper channel and onto a surface to be wiped.

Additionally, a method for manufacturing a wiper blade is provided wherein a wiper element is slidably inserted into a bottom channel of an extruded metallic frame. The wiper element depends from the bottom channel and through a slot in the bottom channel to make wiping contact with a surface to be wiped. A wall of the bottom channel is then staked to fix the wiper element within the bottom channel. An optional method eliminates the staking step and installs a pair of end plugs into each end of the frame to releasably maintain the wiper element within the bottom channel.

Some advantages of the invention include providing for increased efficiencies in the manufacture and assembly of a heavy-duty wiper blade assembly by reducing the number of operations required to produce the wiper blade assembly, by reducing the scrap, by improving the handling of the wiper blade components during assembly and by reducing the time required for assembly, thus reducing the total costs of producing the wiper blade assembly.

Another advantage of the invention is the ability to utilize the closed upper channel as a passage for conveying wiper fluid from which the fluid may be dispensed directly on the surface to be wiped.

Another advantage of the invention is a reduction in the amount of material used in the wiper element.

THE DRAWINGS

These and other features and advantages of the present invention will become more readily appreciated when considered in connection with the following detailed description and appended drawings, wherein:

FIG. 1 is a perspective view of a wiper blade assembly showing a first preferred embodiment of the present invention;

FIG. 3 is a front elevation view of a second embodiment of the present invention;

DETAILED DESCRIPTION

Figure 2:
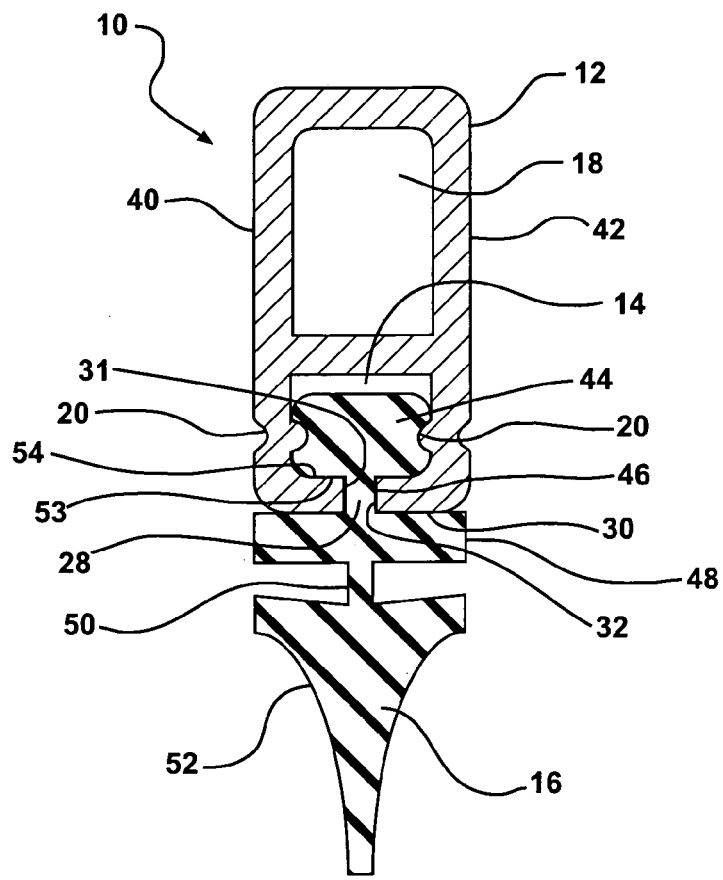
FIG. 2 is a cross-sectional view taken generally along lines 2—2 of FIG. 1.
Figure 4:
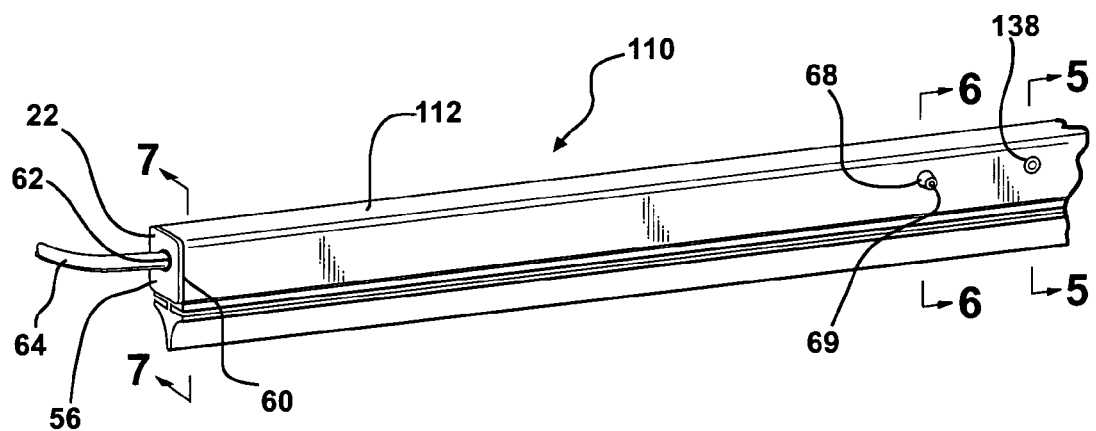
FIG. 4 is a fragmentary isometric view of the blade assembly of FIG. 3.

FIGS. 1 and 2 show a heavy-duty wiper blade assembly 10 constructed according to a first preferred embodiment of the present invention. The wiper blade assembly 10 has an extruded frame 12 having a bottom channel 14 that receives a wiper element 16, and an upper channel 18 that is separate from the bottom channel 14. The wiper element 16 is slidably received in the bottom channel 14 and is maintained in the bottom channel 14 by a protuberance or preferably a plurality of protuberances 20.

The frame 12 of the wiper blade assembly 10 is extruded into one internal member from a metallic material, such as aluminum, or any other extrudable metallic material. The finished frame 12 has a pair of ends 24, 26. The bottom channel 14 and upper channel 18 extend between the ends 24, 26.

The bottom channel 14 has slot 28 formed along the bottom channel 14 between the pair of ends 24, 26 having openings 27, 29 such that a bottom surface 30 of the bottom channel 14 preferably has a pair of opposing lips 31, 32 extending generally toward one another, thus causing the bottom channel 14 to be generally C-shaped in cross-section, as shown best in FIG. 2.

The upper channel 18 of the frame 12 is a generally closed channel other than openings 34, 36 at the ends 24, 26 of the frame 12, and an aperture 38 formed in a sidewall or opposing sidewalls 40, 42 of the upper channel 18 between the ends 24, 26 of the frame 12.

The aperture 38 formed in the opposing sidewalls 40, 42 of the upper channel 18 is preferably formed equidistant from either end 24, 26 and receives a mounting pin (not shown) therethrough so that the wiper blade assembly 10 can be attached to a wiper arm (not shown).

As best shown in FIG. 2, the wiper element 16 has a crown portion 44, a neck portion 46, a bumper portion 48, a hinge portion 50, and a body portion 52. The wiper element 16 is received by the bottom channel 14 by sliding the crown portion 44 of the wiper element 16 into one of the openings 27, 29 of the bottom channel 14. The pair of opposing lips 31, 32 forming the bottom surface 30 of the bottom channel 14 extend generally inwardly toward the neck portion 46 such that they capture and releasably maintain the wiper element 16. Though the wiper element 16 is releasably maintained within the channel 14 by the lips 31, 32, the wiper element 16 is still able to slide transversely within the bottom channel 14.

Preferably, the crown portion 44 of the wiper element 16 conforms generally in shape to the bottom channel 14. A bottom surface 53 of the crown portion 44 is preferably in mating contact with an upper surface 54 of the lips 31, 32 such that the crown portion 44 is maintained within the bottom channel 14 during assembly 10. The neck portion 46 of the wiper element 16 depends from the crown portion 44 and passes between the lips 31, 32 of the frame 12 and joins the bumper portion 48 of the wiper element 16. The bumper portion 48 of the wiper element 16 contacts the bottom surface 30 of the lips 31, 32. The wiper element 16 can be secured against relative sliding movement within the channel 14 by staking a side-wall or sidewalls 40, 42 of the bottom channel 14, such that a plurality of protuberances 20 extend laterally inwardly into gripping engagement with the crown portion 44 of the wiper element 16. As shown in FIG. 1, preferably two protuberances 20 are staked adjacent each end 24, 26 of each side-wall 40, 42 of the frame 12. However, it should be recognized that any number of protuberances 20 may be staked depending on the requirements of the wiper blade application.

FIGS. 3–7 show an alternative embodiment of a wiper blade assembly of the invention generally at 110. The same reference numerals are used to designate like features to those of the first embodiment, but are offset by 100. The assembly 110 includes an upper channel 118 in which a pair of end plugs 22, 23 are installed. The channel 118 communicates with a source of pressurized wiper fluid (not shown) through one of the end plugs 22, 23. The wiper fluid can travel through and be dispensed from the upper channel 118 directly onto the surface to be wiped by the wiper blade assembly 110. Also, the wiper element 116 is preferably releasably maintained in the bottom channel 114 by a bottom portion 56 of the pair of end plugs 22, 23, thus enabling the wiper element 116 to be quickly and easily replaced when needed. It should be recognized however, that a staking operation could be used here as performed in the first preferred embodiment.

The pair of end plugs 22, 23 are preferably sized so that they can be press fit into the openings 134, 136 at the ends 124, 126 of the upper channel 118 such that they have an interference fit or other suitable mechanical retention (e.g. latches), and create a generally fluid tight seal therein. The end plugs 22, 23 are shaped to have a plug portion 58 that fits within the upper channel 118, and a face portion 60 that remains in mating contact with an end 124, 126 of the frame 112. One end plug 22 preferably has a through hole 62 such that a hose 64 can be connected in the through hole 62 of the end plug 22 to provide for communication of fluid between the upper channel 118 and the source of pressurized wiper fluid. The wiper fluid can then be received within the upper channel 118 of the wiper blade assembly 110 and be dispensed from the upper channel 118 through a nozzle 64 and directed onto the surface to be wiped by the wiper blade assembly 110. It should be recognized however, that the hose 64 could be received in an opening anywhere along the upper channel 118 between the two ends 24, 26 of the upper channel 118, and not through one of the end plugs 22, 23 in the pair of ends 124, 126 of the frame 112.

The end plugs 22, 23 preferably extend downwardly from the upper channel 118 so that the face portion 60 blocks or covers at least a portion of the bottom channel 114. With at least one end plug 22, 23 removed from the bottom channel 114, the wiper element 116 can be slidably received within the bottom channel 114, and the end plug or end plugs 22, 23 can then be press fit into the bottom channel 114. The face portions 60 of the plugs 22, 23 then releasably maintain the wiper element 116 within the bottom channel 114. If the wiper element 116 needs replacing, one of the end plugs 22, 23 can simply be removed to slidably remove the wiper element 116 from the bottom channel.

Figure 6:
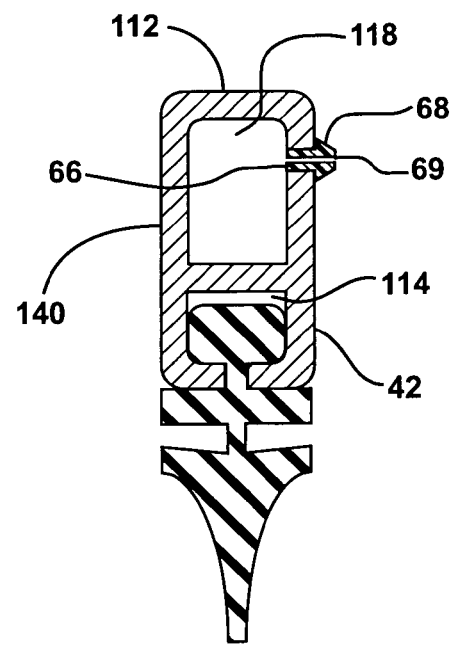
FIG. 6 is a cross-sectional view taken generally along lines 6—6 of FIG. 4.
Figure 7:
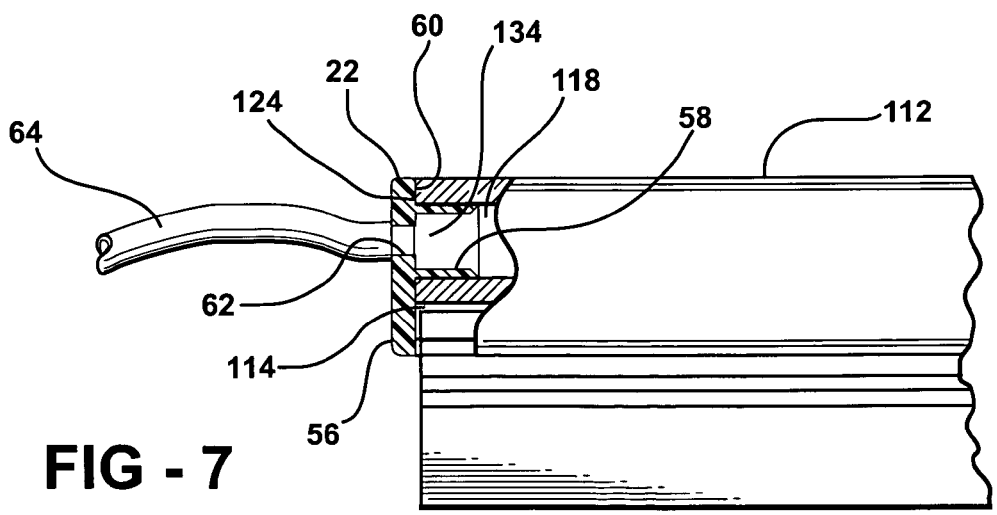
FIG. 7 is an enlarged fragmentary elevation view, shown partly in section, of FIG. 4.

As best shown in FIG. 6, another opening 66 in one of the side walls 40, 42 of the upper channel 118 has the nozzle 64 received therein. The nozzle 68 is fixed in the opening 66 of the upper channel 118 such that the nozzle 68 is maintained in sealing engagement with the opening 66. The nozzle 64 has a through hole 69 that is formed to dispense wiper fluid from the upper channel 118 such that the wiper fluid exits preferably in a desired spray pattern. The nozzle 68 is shown here to be generally equidistant between the two ends 24, 26 of the upper channel 118. It should be recognized however, that the opening 66 used to receive the nozzle 68 can be placed anywhere along the length between the two ends 24, 26 of the upper channel 118, as best suited for the application. It should also be recognized that any number of nozzles 68 can be employed within the sidewalls 140, 142 to insure adequate coverage of wiper fluid on the surface to be wiped by the wiper blade assembly 110.

Figure 5:
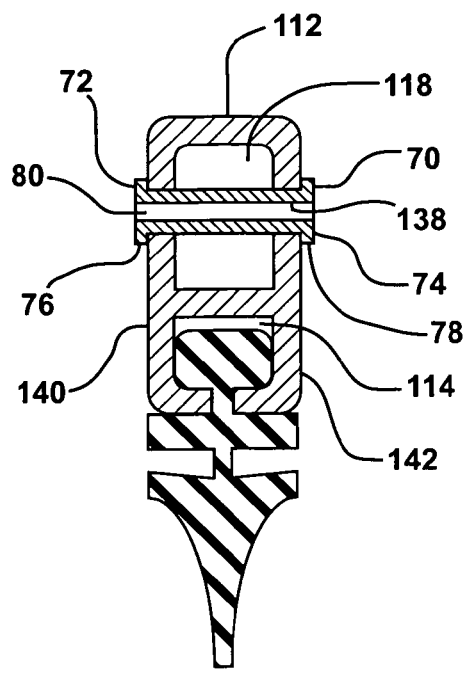
FIG. 5 is a cross-sectional view taken generally along lines 5—5 of FIG. 4.

As best shown in FIG. 5, a grommet 70 is installed in the aperture 138 to create a fluid tight seal between the mounting pin and the upper channel 118 to prevent any wiper fluid from leaking between the aperture 138 and the mounting pin. Ends 72, 74 of the grommet 70 are formed with radially enlarged flanges 76, 78 for securing and sealing the grommet 70 within the aperture 138. The grommet 70 has a tubular body passing through the upper channel 118, defining a through hole 80 for accommodating the mounting pin (not shown). Other suitable means for creating a seal between the aperture 138 and the mounting pin to prevent wiper fluid from exiting the aperture 138 is contemplated by this invention, such as applying a coating to the walls of the aperture 138 or to the mounting pin so that the coating provides a fluid-tight seal.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of manufacturing a flat wiper blade assembly, comprising:

forming a wiper element;

extruding a metallic frame having a generally closed upper channel and an open bottom channel with a slot transversing a wall spanning the length of the bottom channel to receive the wiper element;

slidably inserting the wiper element into the bottom channel of the frame so that the wiper element depends from the bottom channel and through the slot to make wiping contact with a surface to be wiped;

installing a pair of end plugs into an opening at each end of the upper channel and across at least a portion of the bottom channel to releasably maintain the wiper element within the bottom channel;

providing a hose and a nozzle;

forming an opening in a sidewall of the upper channel;

connecting the hose to the upper channel so as to be operative to provide for fluid communication between the upper channel and a source of wiper fluid under pressure provided through the hose; and inserting the nozzle into the opening in the upper channel so that wiper fluid can be dispensed through the nozzle and onto a surface to be wiped.

2. The method of manufacturing a flat wiper blade assembly of claim 1, further comprising:

providing a grommet having a through hole;

forming an aperture in at least one sidewall of the upper channel;

inserting the grommet into the aperture so that the grommet is maintained within the aperture and provides for a fluid tight seal between a mounting pin passing through the hole in the grommet and the aperture.

3. A method of manufacturing a flat wiper blade assembly, comprising:

extruding a rigid metallic frame extending longitudinally between opposite ends with an open bottom channel having a pair of laterally spaced side walls and a bottom wall formed with a longitudinally extending slot, and an upper channel having a partition wall separating said upper channel from said bottom channel, and a pair of laterally spaced side walls of said upper channel extending upwardly from said partition wall, and a top wall extending between said side walls and spaced from said partition wall to enclose said upper channel, and mechanically deforming a protuberance extending laterally from a side wall of said bottom channel, disposing a resilient wiper element extending longitudinally and having a crown, a neck and a body in said bottom channel with said neck extending through said slot and said body extending below said frame with said protuberance extending laterally inwardly into gripping engagement with said wiper element to secure said wiper element against longitudinal movement relative to said bottom channel.

4. A method of manufacturing a flat wiper blade assembly, comprising:

extruding a rigid metallic frame extending longitudinally between opposite ends with an open bottom channel having a pair of laterally spaced side walls and a bottom wall formed with a longitudinally extending slot, and an upper channel having a partition wall separating said upper channel from said lower channel, and a pair of laterally spaced side walls of said upper channel extending upwardly from said partition wall, and a top wall extending between said side walls and spaced from said partition wall to enclose said upper channel; and forming a fluid inlet opening in said upper channel for receiving wiper fluid within said upper channel, forming a fluid outlet opening for discharging wiper fluid from said upper channel, and disposing a fluid nozzle communicating with said fluid outlet opening.

5. A method of manufacturing a flat wiper blade assembly, comprising:

extruding a rigid metallic frame extending longitudinally between opposite ends with an open bottom channel having a pair of laterally spaced side walls and a bottom wall formed with a longitudinally extending slot, and an upper channel having a partition wall separating said upper channel from said lower channel, and a pair of laterally spaced side walls of said upper channel extending upwardly from said partition wall, and a top wall extending between said side walls and spaced from said partition wall to enclose said upper channel; and forming a mounting aperture in said side walls of said upper channel for receiving a mounting pin.

* * * * *